UNITED STATES PATENT OFFICE.

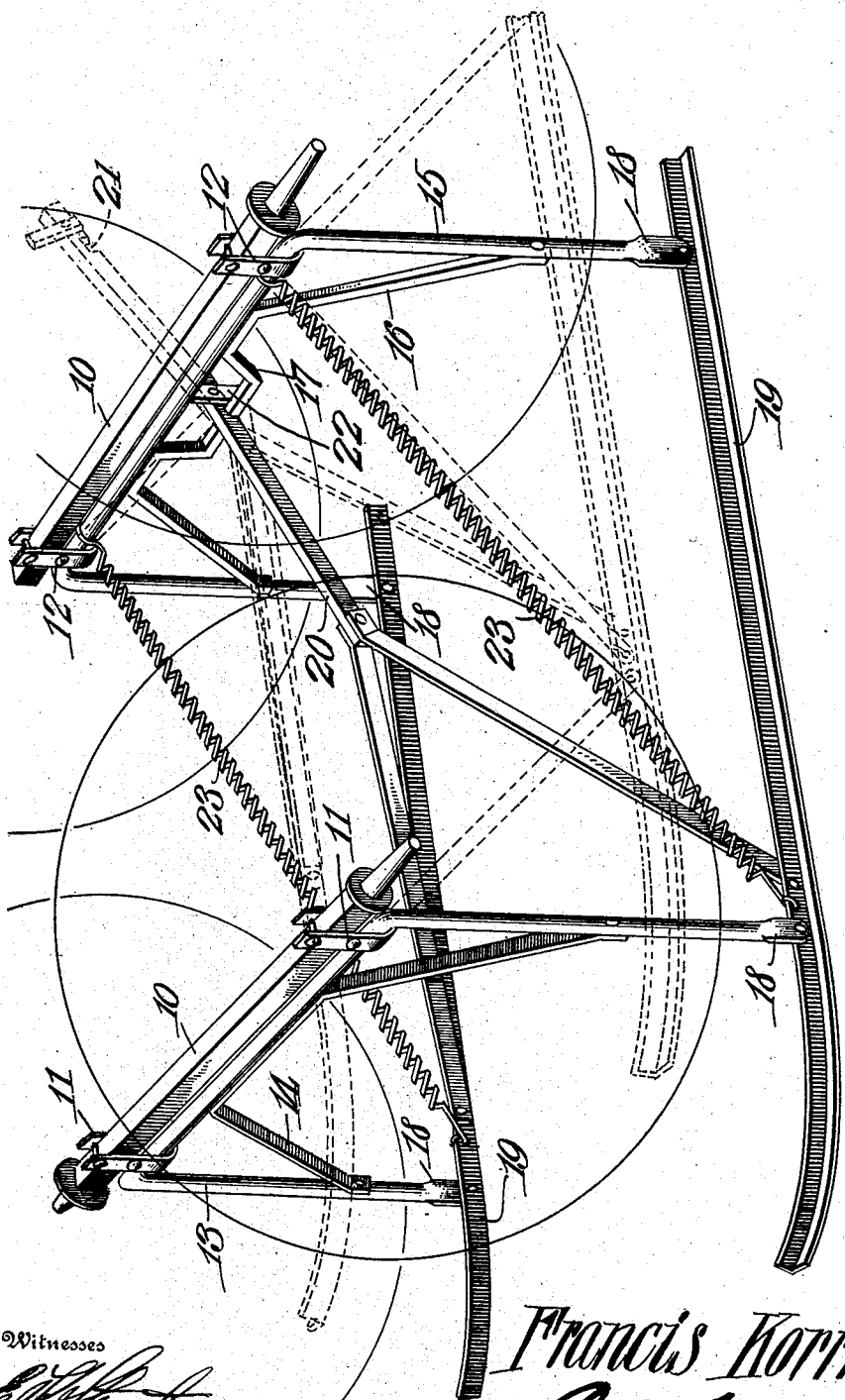

FRANCIS KORFF, OF LANSING, MICHIGAN.

SLEIGH-RUNNER ATTACHMENT FOR VEHICLES.

No. 900,937.	Specification of Letters Patent.	Patented Oct. 13, 1908.

Application filed April 27, 1908. Serial No. 429,413.

*To all whom it may concern:*

Be it known that I, FRANCIS KORFF, a citizen of the United States, residing at Lansing, in the county of Ingham and State of Michigan, have invented a new and useful Sleigh-Runner Attachment for Vehicles, of which the following is a specification.

This invention relates to sleigh runner attachments for wheeled vehicles, with especial reference to sleigh runner attachments for baby carriages.

The object of the invention is to provide an improved form of such attachment which may readily be applied to any existing vehicles of the character described and which may be easily operated to change the vehicle from a wheeled carriage to a carriage adapted to be moved about on sleigh runners.

The invention comprises a pair of sleigh runners attached to the axle of a wheeled vehicle and mechanism whereby the runners may be placed in operative position or displaced therefrom.

The invention further consists in certain novel details of arrangement and combinations of parts, hereinafter fully described, illustrated in the accompanying drawings, and specifically claimed.

In the accompanying drawings, the figure represents a perspective view of the attachment as applied to the axles of a vehicle.

The vehicle axles are indicated by the numeral 10. Upon the axles 10 are detachably mounted bearings 11 and 12. In the present illustration the bearings 11 are supposed to be mounted upon the front axle, while the bearings 12 are mounted upon the rear axle. In the bearings 11 of the front axle is mounted a U-frame 13 which is provided with suitable braces, as indicated at 14. The U-frame 13 is so mounted in the bearings 11 that the legs of the U extend downward, as illustrated in the figure, these legs being substantially vertical when the sleigh runners are in operative position. In the bearings 12 is a similar U-frame 15 provided with a brace iron 16. Located medially of the frame 15, the brace iron 16 has a downwardly bent portion, as indicated at 17. The U-frames 13 and 15 have the lower ends of their legs flattened, as indicated at 18, and pivotally connected thereto are runners 19.

In the preferred form of the invention, the runners 19 are made of angle iron with upwardly bent forward ends, as clearly indicated in the figure. Pivotally attached to the runners 19 and passing between the U-frame 15 and the downwardly bent portion 17 of the brace iron 16 is a Y-bar 20 provided with a notch 21 adapted to engage the downwardly bent portion 17 before referred to, and further provided with a stop 22 to prevent said Y-bar being displaced from position relatively to the downwardly bent portion 17 and the U-frame 15. Attached to the runners 19 and the U-frame 15 are springs 23 which normally tend to place the parts in the position shown in the dotted lines in the figure.

In the operation of the device, let it be assumed that the parts are in the positions indicated by the full lines. The sleigh runners will then be upon the ground and the device can be used as a sleigh. Should it be desired to use the vehicle as a wheeled vehicle, it is merely necessary to raise the Y-bar 20 sufficiently to disengage the slot 21 from the portion 17 of the brace iron 16. The springs 23 will then pull the sleigh runners into the position shown by dotted lines. Should it be again desired to convert the vehicle to a sleigh, it is merely necessary to push down upon the Y-bar 20 until the slot 21 again engages the portion 17 of the brace iron, and the vehicle will thus be converted into a sleigh. There is thus provided a simple and efficient means to change a wheeled vehicle to a sleigh, and vice versa.

I claim:—

1. In a device of the kind described, a pair of wheeled axles, U-frames carried on said axles, a brace bar on one of said U-frames provided with a downwardly extending median portion, and a bar passing between the downwardly extending portion and the U-frame attached to said axles and provided with a slot therein adapted to engage the downwardly extending portion of the brace bar and hold said U-frame in fixed relation to said axles.

2. In a device of the kind described, a pair of wheeled axles, U-frames carried on said axles, sleigh runners pivotally mounted on said U-frames, a brace bar on one of said U- frames provided with a downwardly extending median portion, a Y-bar provided with a notch therein held between said downwardly extending portion of the brace bar and said U-frame and pivotally connected to said sleigh runners, and springs normally raising said runners from the ground.

In testimony that I claim the foregoing as my own, I have hereto affixed my signature in the presence of two witnesses.

FRANCIS KORFF.

Witnesses:
   A. R. HARDY,
   O. D. HARDY.